Figure 1:
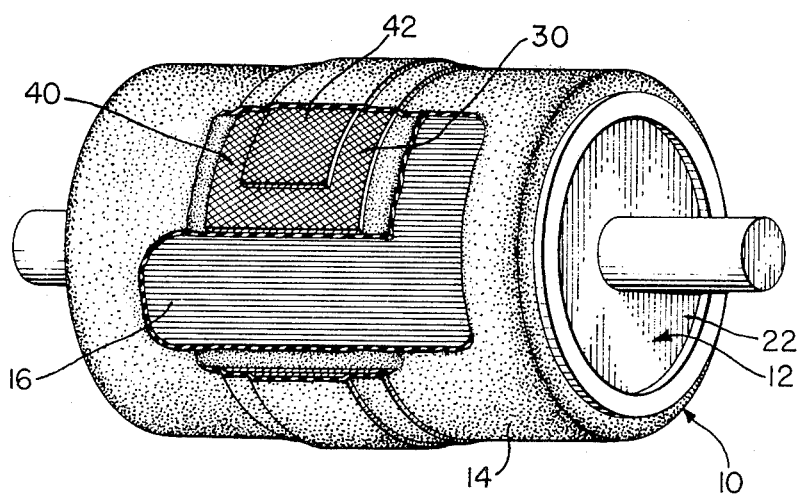

United States Patent [19]
Schmit

[11] 3,990,930
[45] Nov. 9, 1976

[54] BLADDER FOR TIRE BUILDING APPARATUS AND METHOD OF MAKING THE SAME

[75] Inventor: Georges Schmit, Bridel, Luxemburg

[73] Assignee: The Goodyear Tire & Rubber Company, Akron, Ohio

[22] Filed: Aug. 21, 1975

[21] Appl. No.: 606,629

Related U.S. Application Data

[63] Continuation of Ser. No. 178,874, Sept. 9, 1971, abandoned.

[52] U.S. Cl............................. 156/123; 156/128 R; 156/416
[51] Int. Cl.².................... B29H 17/16; B29H 17/28
[58] Field of Search........ 156/110 R, 123 R, 128 R, 156/128 I, 133, 394 R, 414, 416

[56] References Cited
UNITED STATES PATENTS

| 2,084,009 | 6/1937 | Sohl | 156/416 |
| 3,101,289 | 8/1963 | Giletta et al. | 156/133 |
| 3,144,374 | 8/1964 | Saint-Paul | 156/416 |
| 3,380,872 | 4/1968 | Pouilloux | 156/416 |
| 3,386,875 | 6/1968 | Grote | 156/416 |

FOREIGN PATENTS OR APPLICATIONS

| 1,000,262 | 8/1965 | United Kingdom | 156/416 |

Primary Examiner—William A. Powell
Assistant Examiner—John E. Kittle
Attorney, Agent, or Firm—F. W. Brunner; R. S. Washburn

[57] ABSTRACT

A bladder for use in conjunction with a tire building drum, said bladder having cords extending substantially parallel to the rotational axis of the bladder and including two belt plies of square woven fabric extending circumferentially about the bladder. The bladder is manufactured by first providing an at least partially cured cylindrical membrane reinforced with cords extending substantially parallel to the rotational axis of the membrane. The membrane is then expanded to a toroidal configuration and an uncured belt structure is applied to the expanded membrane. The membrane is then contracted to the cylindrical configuration and the belt structure is cured.

8 Claims, 8 Drawing Figures

BLADDER FOR TIRE BUILDING APPARATUS AND METHOD OF MAKING THE SAME

This is a continuation of application Ser. No. 178,874, filed Sept. 9, 1971, now abandoned.

The foregoing abstract is not to be taken as limiting the invention of this application, and in order to understand the full nature and extent of the technical disclosure of this application, reference must be made to the accompanying drawings and the following detailed description.

This invention relates to expandable bladders for use in conjunction with tire building machines, and more particularly to an expandable bladder for use on a two-stage tire building drum.

In the building of pneumatic tires, and particularly when building radial ply tires, a "two-stage" drum may be used whereby certain components are applied to the tire building drum while the drum is in a generally cylindrical configuration and thereafter the central portion of the tire building drum is expanded substantially in order to form the partially built tire into a generally toroidal configuration to receive a belt structure. At this point additional components such as the belt structure and tread stock are applied to the tire carcass.

It is desirable to have a tire building drum which provides a true, firm surface when the drum is in the cylindrical configuration, is capable of expansion to a toroidal configuration and, when in the expanded shape, has a true, firm outer cylindrical surface beneath the area of the partially built carcass which is destined to receive the belt structure. If the radially outer surface of the expanded bladder is oval in cross-section, it becomes difficult to accurately locate the belt structure and, once located, the belt structure is difficult to stitch down to the outer surface of the tire carcass.

An object of this invention, therefore, is to provide a tire building bladder or sleeve for use in conjunction with a tire building drum, said bladder being contractible to a substantially cylindrical or drum-like configuration and expandable to a generally toroidal configuration having a generally cylindrical firm radially outermost surface. A further object of this invention is to provide a method of making such an expandable tire building bladder.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 2:
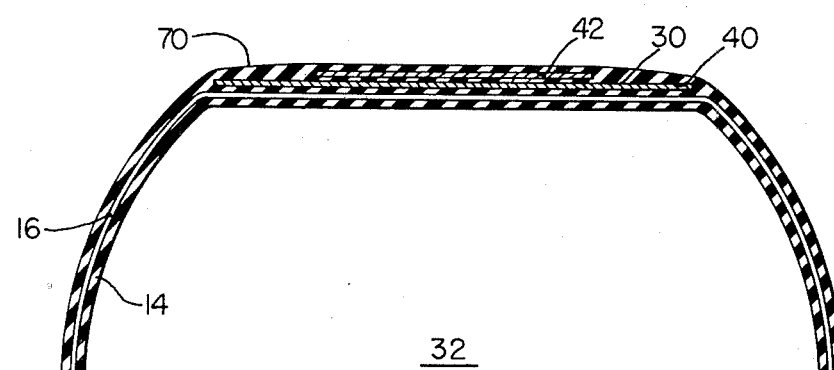

In the drawings:

FIG. 1 is a fragmentary perspective view of a tire building bladder constructed in accordance with this invention and illustrated in an unexpanded configuration on a tire building drum, FIG. 2 is a cross-sectional view of the bladder of FIG. 1 illustrated in an expanded configuration, and FIGS. 3 through 8 illustrate the sequential steps taken in manufacturing the bladder of FIG. 1.

With reference to the drawings, and in particular FIG. 1, there is illustrated a generally cylindrical tire building bladder 10 constructed in accordance with this invention. The bladder 10 is illustrated mounted on a tire building drum 12. Any suitable tire building drum may be used, and therefore the drum 12 illustrated is only schematic.

The bladder 10 includes a generally cylindrical membrane 14 reinforced with cords 16 extending generally parallel to the rotational axis of the drum 12. Axially outermost circumferentially extending bead portions 18 and 20 (best seen in FIG. 2) are sealably mounted on the end plates 22 and 24 of the tire building drum 12. A belt structure 30 is disposed midway between the bead portions 18 and 20 and extends circumferentially about the bladder 10.

More particularly and in accordance with the present invention, the axially extending cords 16 lie in a plane containing the rotational axis of the drum 12, or at least extend at an angle of no less than about 80 degrees with respect to a plane perpendicular to the rotational axis of the bladder 10. The cords can be of any suitable material which is substantially inextensible, such as, by way of example only, nylon, rayon, polyester, or wire. The cords 16 terminate at their axially outer ends in enlarged bead portions 18 and 20. The enlarged bead portions 18 and 20 are suitably clamped in end members or plates 22 and 24 of the drum 12 to form an airtight seal therewith, and further to secure the tire building bladder 10 to the building drum 12. The end members 22 and 24 and the bladder 10 form an airtight chamber 32.

The particular belt structure illustrated includes a first belt ply 40 disposed adjacent to and radially outwardly with respect to the axially extending cords 16. The first ply 40 is of square woven rayon and is located midway between the axially outer ends of the membrane 14. A second belt ply 42 extends circumferentially about the first belt ply 40 and again is made of square woven rayon cord fabric. The second belt ply 42, in the particular embodiment illustrated, is approximately 33 percent narrower than the first belt ply 40. While the material for the belt structure 30 in the bladder illustrated is rayon cord fabric, it will be appreciated by those skilled in the art that any suitable cord fabric could be utilized, such as, by way of example only, nylon or polyester.

Figure 3:
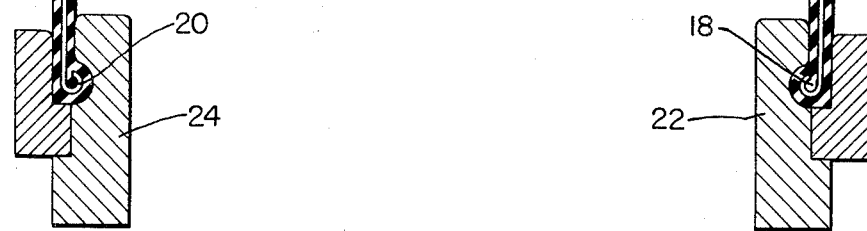
Figure 3:
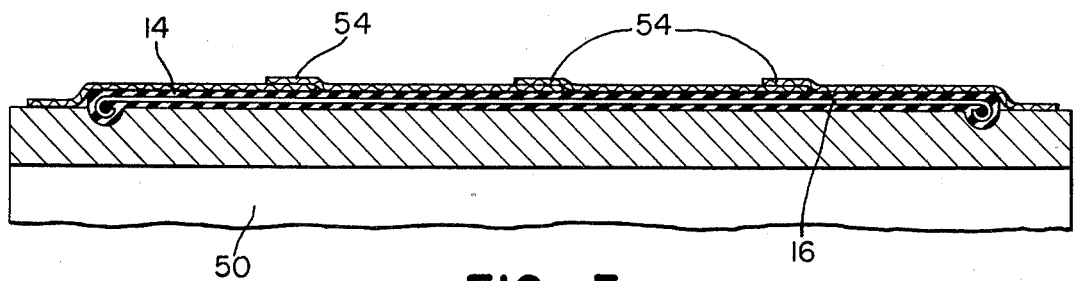

The tire building bladder 10 is manufactured by first providing a generally cylindrical membrane 14 (best seen in FIG. 3) having generally axially extending cords 16, as described above, and enlarged bead portions 18 and 20. The membrane 14 is at least partially cured while maintained in a substantially cylindrical configuration. By way of example only and as illustrated in FIG. 3, the membrane 14 can be at least partially cured by mounting the bladder 16 on a rigid cylindrical drum 50 and wrapping a fabric tape 54 around the membrane 14. The entire assembly is then placed in a heater and the membrane 14 is at least partially cured.

Figure 4:
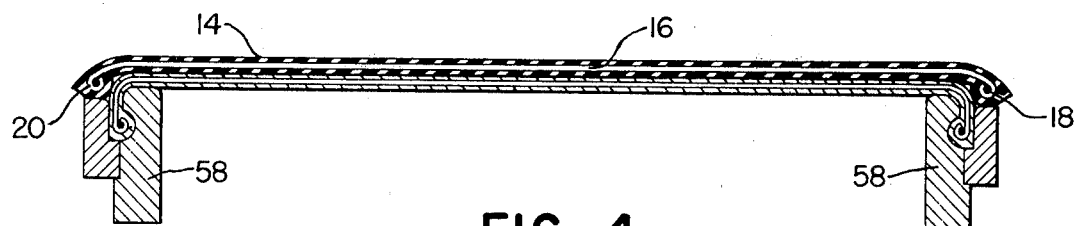
Figures 5, 6:
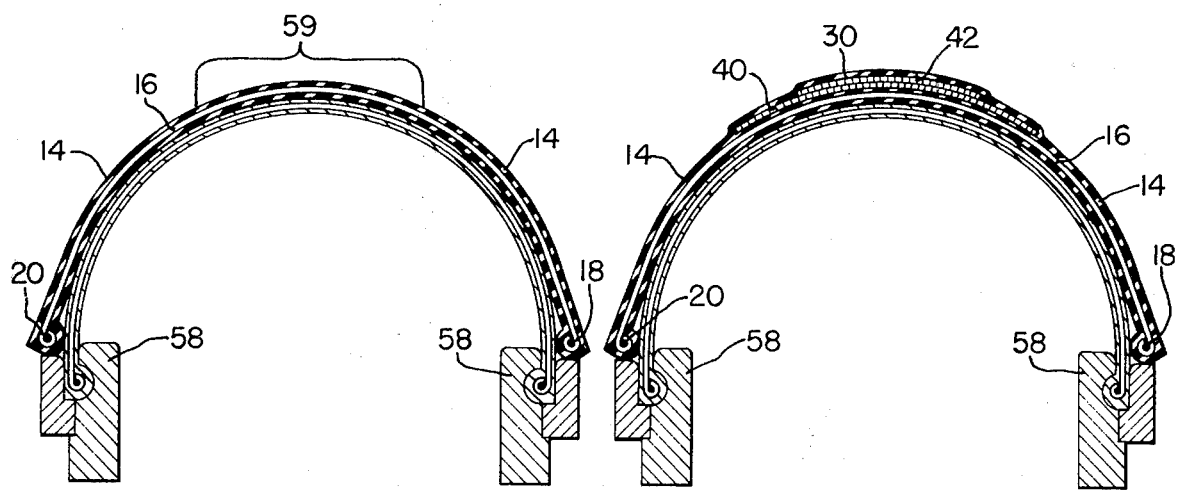

As seen in FIG. 4, the membrane 14 is then mounted on a cylindrical building drum 58 which is expandable to a generally toroidal configuration. The drum 58, as illustrated in FIG. 5, is expanded to a generally toroidal configuration, and thus expands the membrane 14 to a similar configuration. The central area 59 of the membrane 14 midway between the bead regions 18 and 20 is buffed and an adhesive is applied.

As best seen in FIG. 6, a pair of square woven rubber-coated fabric plies 40 and 42 are applied to the central portion 59 of the expanded membrane 14 and stitched tightly thereto by any conventional means. The belt plies 40 and 42 are square woven fabric and, when they are applied to the membrane 14, have their cords extending at an angle of approximately 45° with respect to a plane located midway between the bead portions 18 and 20 and perpendicular to the rotational axis of the drum 58.

Figure 7:
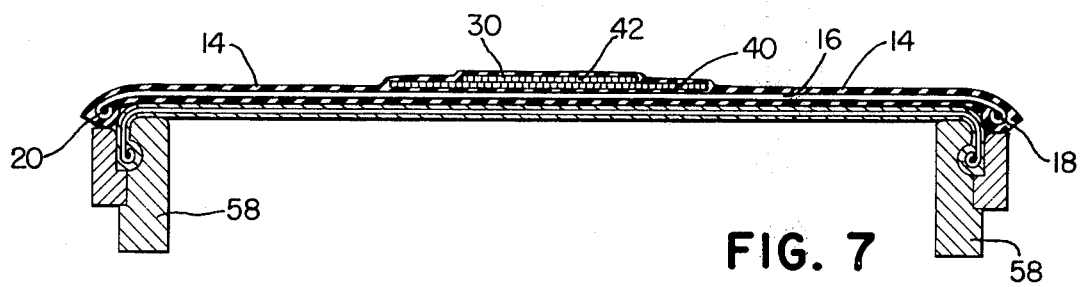
Figure 8:
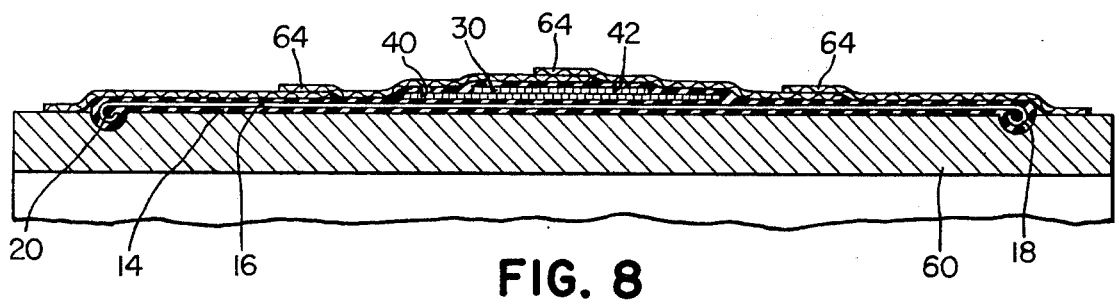

As seen in FIG. 7, the drum 58 is then collapsed, allowing the bladder 14 to return to its original cylindrical configuration. In doing so, the membrane 14 draws the uncured belt plies 40 and 42 down approximately to the diameter of the membrane 14 in its original partially cured configuration. The cord angle of the belt plies increases to about 60° with respect to a plane midway between the bead portions 18 and 20 and perpendicular to the rotational axis of the drum. The belt gets wider and the cords in the belt plies are compressed longitudinally. With reference to FIG. 8, the building bladder 10, including the membrane 14 plus the belt plies 40 and 42, is then placed on a solid drum 60 similar to that illustrated in FIG. 3. The bladder 10 is then wrapped with a fabric tape 64, the assembly is placed in any suitable heater and the belt structure 30 is vulcanized. The bladder 10 can then be removed from the curing device and mounted on a suitable tire building drum, as illustrated in FIGS. 1 and 2.

In the use of the bladder 10 the drum 12 is originally arranged with its end members 22 and 24 spaced apart such that the cords 16 in the bladder 10 are drawn tight therebetween and the bladder forms a generally drum-like configuration substantially from end to end as seen in FIG. 1. This is the configuration in which the drum is maintained during the initial building operation of the tire. Subsequently, the end members 22 and 24 are drawn together and the cavity 32 formed by the end members 22 and 24 and the bladder 10 is pressurized by a suitable means such as compressed air. The bladder 10 expands to the generally toroidal configuration illustrated in FIG. 2. The novel belt structure made according to the method above described and having belt plies of varying widths restrains the central portion of the bladder 10 and forms a substantially cylindrical firm building surface 70 which permits accurate location of belt members in the tire structure, as well as permits neat and even stitching of the belt and tread edges.

It is not intended that this invention be limited to the specific embodiments illustrated but could include various modifications thereof. For example, the outer belt ply 42 need not be precisely 33 percent narrower than the inner belt ply 40 but should be between about 15 and 50 percent narrower than the inner belt ply 40. Also, there may be one, two or more belt plies and they could be made of continuous parallel cord fabric instead of square woven fabric. If more than two plies are used they should vary in width from a widest belt ply to a narrowest belt ply which is about one-half to one-third as wide as the widest belt ply. When bias-laid, continuous, parallel cord fabric is used for the belt plies, the cords in the plies should form an angle of between 35° and 60° with respect to a plane perpendicular to the rotational axis of the bladder and midway between the bead portions when the bladder is expanded. Successive belt plies should extend at opposite angles with respect to this plane. It will also be appreciated that the order of application of the belt plies to the membrane can be altered, such as in the case of two belt plies the narrowest belt ply can be arranged radially inwardly with respect to the widest belt ply. Also, for example, more than one ply of cords 16 extending from bead 18 to bead 20 may be used and the cords may extend at angles between about 80° and 90° with respect to a plane perpendicular to the rotational axis of the bladder 10.

While certain representative embodiments and details have been shown for the purpose of illustrating the invention, it will be apparent to those skilled in this art that various changes and modifications may be made therein without departing from the spirit or scope of the invention.

What is claimed is:

1. A method of making a bladder for use in conjunction with a tire building drum comprising: (a) providing an at least partially cured generally cylindrical elastomeric membrane reinforced with parallel cords running generally axially of the membrane, (b) expanding the central portion of said membrane, (c) adhering a circumferentially extending belt to the surface of said membrane midway between the axially outer ends of the membrane, (d) permitting said membrane to contact to its generally cylindrical configuration and draw the belt radially inwardly to a reduced diameter, and (e) curing the belt while said membrane is in a generally cylindrical configuration.

2. A method as claimed in claim 1, wherein the belt is applied to the radially outer surface of the membrane.

3. A method as claimed in claim 1, wherein the central portion membrane is expanded, prior to adhering the belt to the membrane, to a diameter which is within one-half an inch of the maximum expanded diameter of the bladder during its ultimate use in conjunction with a tire building drum.

4. A method as claimed in claim 3, wherein the belt is adhered to the radially outer surface of the membrane.

5. A method as claimed in claim 1 further including providing said circumferentially extending belt with a crossed cord reinforcing structure with the cords in said reinforcing structure extending at an angle of between 35° and 60° with respect to planes perpendicular to the rotational axis of the bladder and, while drawing the belt radially inwardly to a reduced diameter, increasing the angle said cords makes with a plane perpendicular to the rotational axis of the tire.

6. A method as claimed in claim 5 wherein the cords in said belt reinforcing structure are arranged in a square woven configuration and extend at an angle of about 45° with respect to said planes perpendicular to the rotational axis of the tire when said sleeve is radially expanded and when said belt is arranged on said membrane.

7. A method as claimed in claim 4 further including providing said circumferentially extending belt with a crossed cord reinforcing structure with the cords in said reinforcing structure extending at an angle of between 35° and 60° with respect to planes perpendicular to the rotational axis of the bladder and, while drawing the belt radially inwardly to a reduced diameter, increasing the angle said cords make with a plane perpendicular to the rotational axis of the tire.

8. A method as claimed in claim 7 wherein the cords in said belt reinforcing structure are arranged in a square woven configuration and extend at an angle of about 45° with respect to said planes perpendicular to the rotational axis of the tire when said sleeve is radially expanded and when said belt is arranged on said membrane.

* * * * *